United States Patent [19]

Walker et al.

[11] 3,813,172

[45] May 28, 1974

[54] PHOTOMETRIC DEVICE WITH A PLURALITY OF MEASURING FIELDS

[75] Inventors: Richard A. Walker, Woodland Hills; Ralph M. Weisner, Canoga Park, both of Calif.

[73] Assignee: Kollmorgen Corporation, Holyoke, Mass.

[22] Filed: Jan. 3, 1972

[21] Appl. No.: 214,588

[52] U.S. Cl.................. 356/225, 356/219, 356/233
[51] Int. Cl. ............................................. G01j 1/42
[58] Field of Search ....... 356/43, 49, 224, 225, 218, 356/219, 233; 250/237 R; 73/355

[56] References Cited
UNITED STATES PATENTS

| | | | |
|---|---|---|---|
| 3,187,574 | 6/1965 | Mason et al. .......................... | 356/49 |
| 3,343,449 | 9/1967 | Blackwell et al. .................. | 356/225 |
| 3,482,448 | 12/1969 | Gaffard................................. | 356/43 |
| 3,536,408 | 10/1970 | Norwood............................. | 356/235 |

Primary Examiner—Ronald L. Wibert
Assistant Examiner—Conrad Clark
Attorney, Agent, or Firm—Edward F. Jaros

[57] ABSTRACT

An optical system for a photometer including a light-measuring path provided with means for accurately defining a plurality of areas from which light is to be measured within a larger field of view.

10 Claims, 9 Drawing Figures

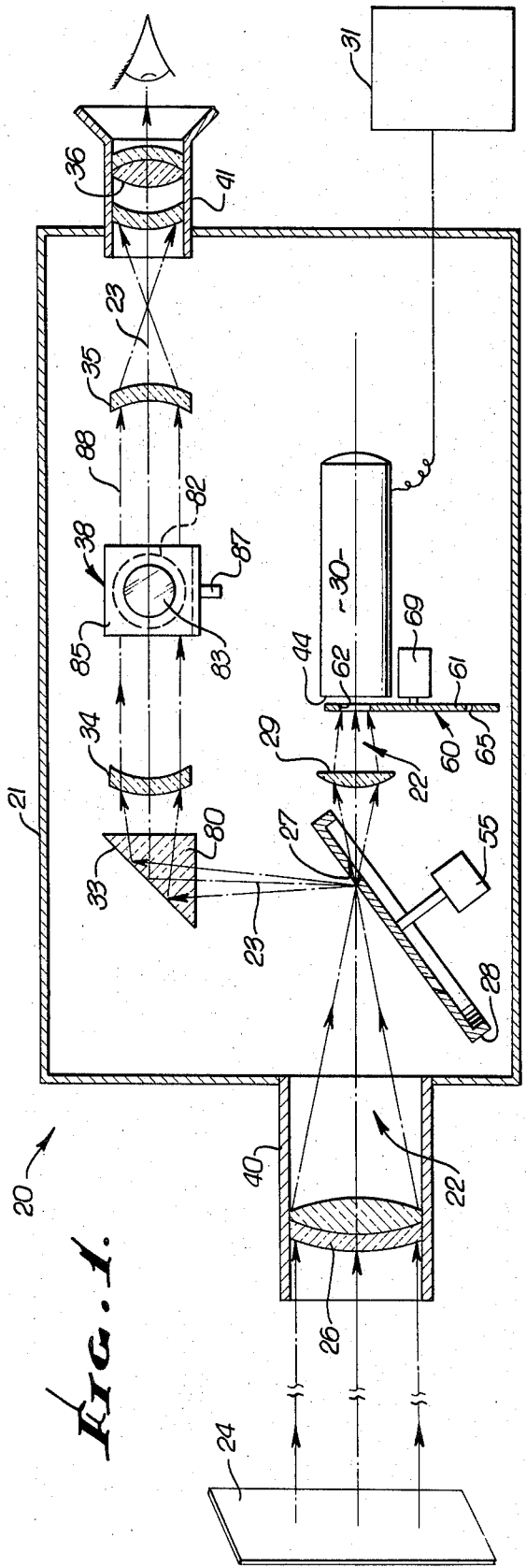
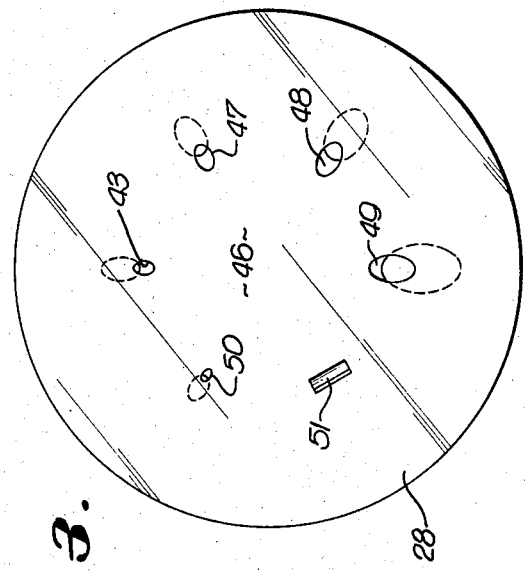
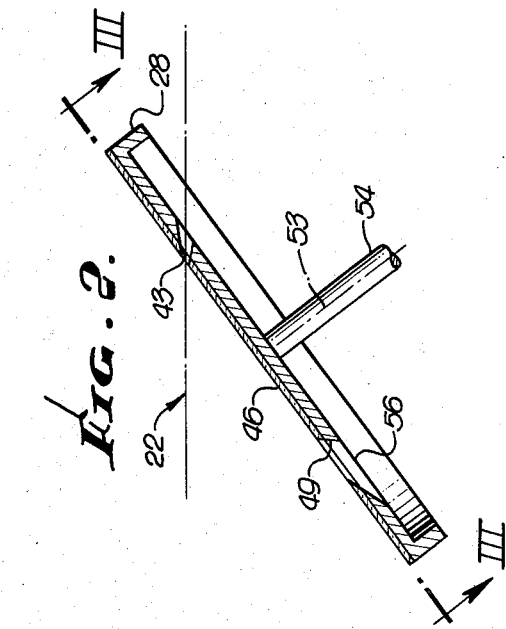
Fig. 1.
Fig. 2.
Fig. 3.

PHOTOMETRIC DEVICE WITH A PLURALITY OF MEASURING FIELDS

BACKGROUND OF THE INVENTION

It is often desirable to determine and to measure light characteristics such as luminance, radiance, color temperature, and the like from an area or spot which is smaller or a part of a larger area or subject being viewed. When making such measurements, it is necessary to accurately define the spot or area which is being measured and the desired area to be measured may be of more than one size.

Prior proposed devices for measuring such limited area or lesser field of view have included optical arrangements which collect a sample of the image-forming light adjacent to the exit pupil of the objective lens. In such arrangements beamsplitting mirrors and rotating or oscillating mirrors which alternately deflect and transmit the light beam have been employed. Disadvantages of such prior arrangements commonly termed "pupil sampling" have included difficulties in obtaining and maintaining accurate registration of the actual measuring field and the measuring field as defined in an associated view finder. Where several different areas are to be measured, the problem becomes more severe. In addition, since the optical system is split into separate uncorrelated paths, the operator may be confused as to which measuring field is being employed if several fields are simultaneously indicated in the view finder as by means of an engraved reticle at the focal plane of the view finder.

Another prior proposed optical arrangement includes means for defining the measuring field at the focal plane of the objective lens, such systems are generally known as "field samplers." Advantages of prior proposed field-sampling devices have included better definition of the area from which light is to be measured and a more brilliant viewing field. Such prior proposed devices included a fiber optics probe one end of which was positionable at the focal plane of the objective lens. However, such prior proposed device included the disadvantages of lack of precise field limits, optical errors in the fiber if polarized light was being measured, and poor transmission of some wave lengths of the spectrum as for example ultraviolet rays. Thus at the present time both pupil sampling and field sampling prior proposed devices have included various disadvantages in precisely accurately defining and measuring a spot-like area of a subject from which the light is to be measured.

Another prior proposed method of changing the measuring field angle is through use of a varifocal or "zoom" lens. However, zoom lenses typically have transmission variations (known as "T-stop" variations) of 10–200 percent as the focal length is changed over its complete range. This results in unacceptable variations in instrument calibration.

SUMMARY OF THE INVENTION

The present invention contemplates a novel optical system for a photometer which avoids the disadvantages of the prior proposed constructions mentioned above and which provides accurate clear definitions of one or more measuring fields of various sizes within a larger field of view. The invention contemplates a simple accurate means to define a plurality of measuring fields in a luminance radiance photometer.

An object of the present invention therefore is to disclose a novel means for accurately unambiguously defining a spot or partial area from which light is being measured of a larger area being viewed.

An object of the present invention is to disclose and provide an aperture means having a plurality of apertures of selected size each adapted to be positioned in a measuring light path at focal plane of the objective lens means.

Another object of the present invention is to disclose and provide an aperture means wherein a plurality of such apertures of different size are provided in a member having a mirror or light-reflecting surface disposed at an angle to the axis of the light-measuring path.

Still another object of the present invention is to disclose an aperture means including a member having a reflectant surface in which the apertures are provided by removing a portion of such reflectant surface.

Still another object of the present invention is to disclose and provide an aperture means for an optical system as described above wherein the aperture means is mounted for rotation about an axis inclined to the axis of the measuring light path whereby the aperture means may selectively position an aperture at the focal plane of the objective lens and whereby a mirror surface on the aperture means may reflect light along a viewing-light path wherein an observer views the area from being measured as a black spot and locates said spot by viewing surrounding portions of the subject being viewed.

Still another object of this invention is to disclose a means for compensating the transmission (T-stop) variations in a varifocal (zoom) lens system, in order to provide a photometer with a continuous range of measuring field angles which are all of identical photometric sensitivity.

Various other objects and advantages of the present invention will be readily apparent from the following description of the drawings in which an exemplary embodiment of this invention is shown.

IN THE DRAWINGS

FIG. 1 is a generally schematic sectional view of an optical system embodying this invention, the section being taken in a vertical plane through an instrument incorporating the optical system;

FIG. 2 is a fragmentary enlarged sectional view of a light transmitting and reflecting means which may be used in said optical system;

FIG. 3 is a plan view of the means shown in FIG. 2, the view being taken along the plane indicated by line III—III of FIG. 2;

DESCRIPTION OF THE PREFERRED EMBODIMENT

Figure 4:
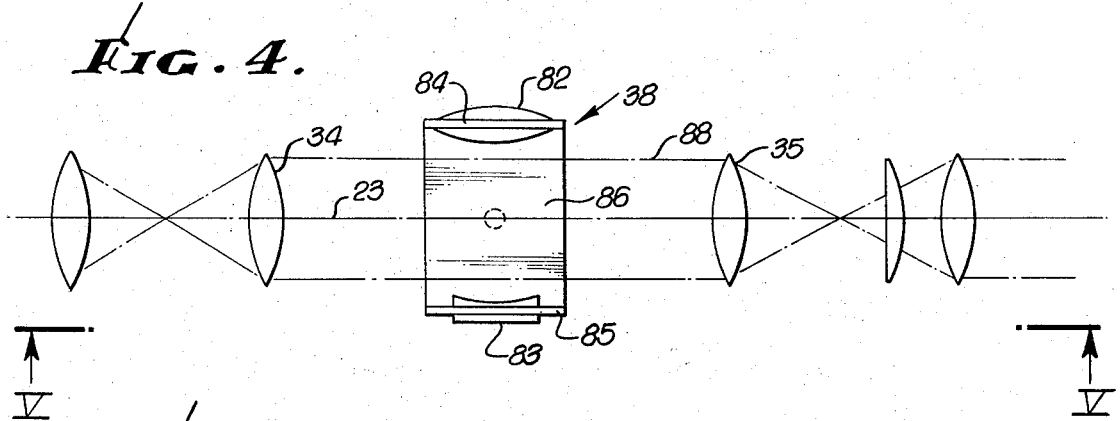
FIG. 4 is an enlarged schematic view of the optical system including the viewing light path of the system shown in FIG. 1 and showing magnification means in the operative position in the viewing light path.

Referring to the drawings, FIG. 1 shows schematically a photometric apparatus, generally indicated at 20, embodying the optical system of this invention. Photometric apparatus 20 generally includes a suitable housing 21 for elements of the optical system which includes a measuring light path, generally indicated at 22, and a viewing light path, generally indicated at 23. The measuring light path transmits light from a subject or source being viewed, indicated schematically at 24. Generally, the measuring light path includes a primary or objective lens 26 an aperture means 27 including a rotatable wheel-like member having a reflecting mirror surface 28, a relay lens means 29, and a photosensor 30. The photosensor is operably connected in well-known manner to a control unit and power supply generally and schematically indicated at 31. Viewing light path 23 generally includes the reflecting surface of the mirror 28 which directs light to a prism 33 which reflects light to a collimating lens 34 for transmission to an erector or decollimating lens 35 spaced therefrom. An eyepiece 36 permits viewing of the subject 24 along the viewing light path. In the collimated portion of the viewing light path between lens 34 and 35 is rotatably mounted an afocal lens system generally indicated at 38.

In detail, housing 21 may be of any suitable construction and form. Housing 21 may be generally rectangular and provided with forwardly projecting objective lens-carrying cylinder or tube 40 which may be made of relatively rotatable portions for focusing of the objective lens 26, such rotatable parts being not shown because they are are well known. The housing 21 also includes a rearwardly projecting smaller cylinder means 41 providing a mounting for the eyepiece lens 36. Cylinder 41 may also include relatively rotatable parts associated with the eyepiece lens to provide a well-known type of monocular readily adjustable to the eye of the observer. Housing 21 on its outer wall surfaces (not shown) may include suitable controls for mechanically operating parts of the optical system, such controls not being described because they are well known.

Measuring light path 22, as mentioned above, includes the primary or objective lens 26 which are suitably mounted in cylinder means 40 for convenient focusing on the subject or source 24. Objective lens 26 is of well-known construction and directs light to the aperture mirror 28, the aperture of which lies in the focal plane of lens 26. In this example a single aperture 43 is positioned at the measuring light path and transmits light along the optical axis of the measuring light path to relay lens 29 which has a front focal plane at the objective lens 26 and a back focal plane at the light sensitive surface 44 of the photosensor 30. Relay lens 29 serves to relay the photons passing through the aperture 43 to light responsive surface 44, and also serves to integrate or average-out the spatial distribution of light within the measuring field.

Aperture wheel 28 with respect to the measuring light path serves to define a smaller or lesser field of view received by objective lens 26 within such larger field of view accepted by objective lens 26. The aperture mirror 28 may comprise a metal mirror such as aluminum, stainless steel, beryllium, chrome plated copper, gold, silver, and the like; or a metallic coated mirror, for example, aluminized plastic, glass or epoxy and the like, such mirrors having a physical hole made through the material of the mirror by suitable methods such as casting, drilling, chemical etching, electrical-discharge-machining, or chemically plating a mirror surface on a predrilled metallic blank. In an aluminized glass mirror in which the reflectant material is deposited on the front surface of the mirror a virtual hole may be provided by removing a selected area of the deposited coating by any suitable process, such as chemical etching.

Mirror wheel 28, FIGS. 2 and 3, has a reflecting surface 46 as described and a plurality of circularly arranged apertures 43 and 47–50 inclusive of generally elliptical form and a rectangular aperture 51. Aperture mirror 28 is mounted for rotation about an axis 53 defined by a shaft 54 engaged by suitable gear means, schematically indicated at 55, to permit incremental rotation of mirror 28 to rotate and position in register with the measuring light path 22 each of the apertures in the mirror. Each aperture in mirror 28 is illustrated as being of oval or elliptical shape at the reflecting surface 46, each of such openings being outwardly flared or enlarged as at 56. Such shape of the aperture openings in the mirror 28 is made so that the projection through any one of said openings will appear on the photosensor surface as a circle since the plane of the mirror 28 is at a selected angle to the measuring light path. It will be understood that such angular relationship between the measuring light path and the mirror may be varied depending upon the geometry of the viewing light path and that the measuring area or shape of the front opening of the apertures in the mirror may be square, trapezoidal, star-shaped, or any other selected and desired shape. The means for rotating the mirror 28 is preferably provided with positioning stops (not shown) to precisely register an aperture in the measuring light path. However, as described later, precise registration of the aperture is not necessary since the image seen by the observer along the viewing light path will accurately define the area of the subject or test source being measured. The several apertures 46–51 and 43 vary in area thus permitting the observer to increase or decrease the measuring field. While the aperture mirror is illustrated at approximately 45° to the measuring light path 22, it will be understood that the angle of the mirror may vary from 10° to 80° and preferably between 30° to 60°.

Photosensor 30 which is provided with a light responsive surface 44 may be a suitable well-known type of photomultiplier tube adapted to measure the light falling upon surface 44. It will be apparent that the photons passing through aperture 43 are relayed by relay lens 29 to the light sensitive surface 44 for measurement.

Figure 8:
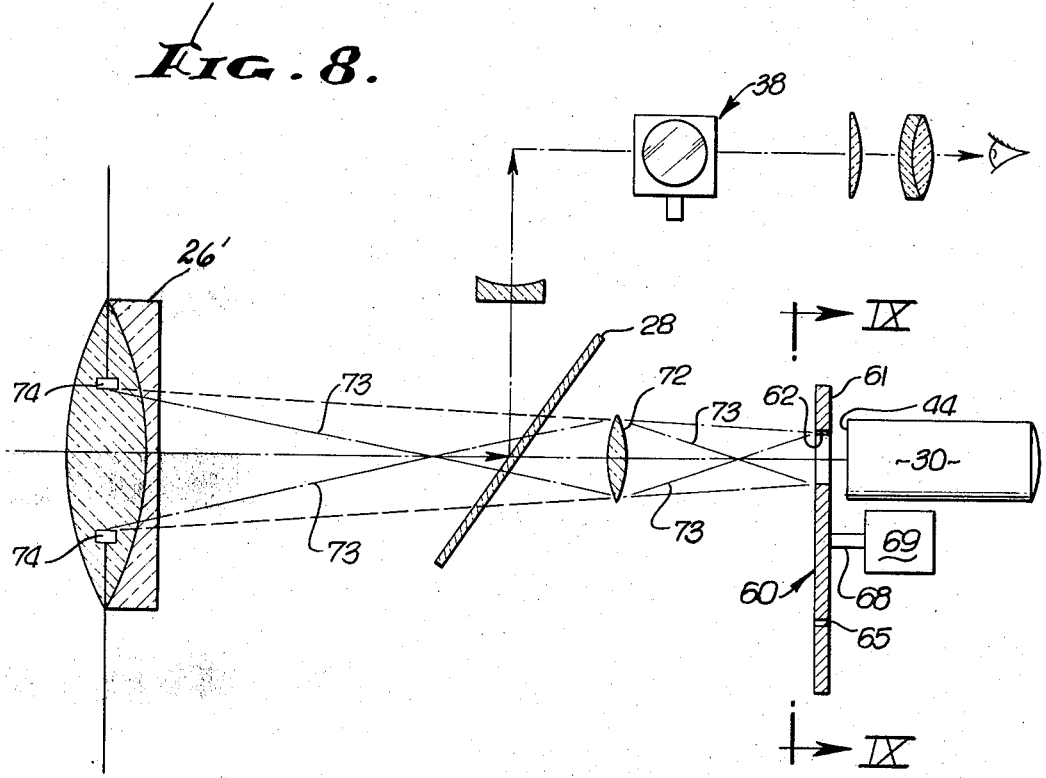
FIG. 8 is a schematic view of a photometer optical system similar to that shown in FIG. 1 and including T-stop or light attenuating means in the light measuring path.
Figure 9:
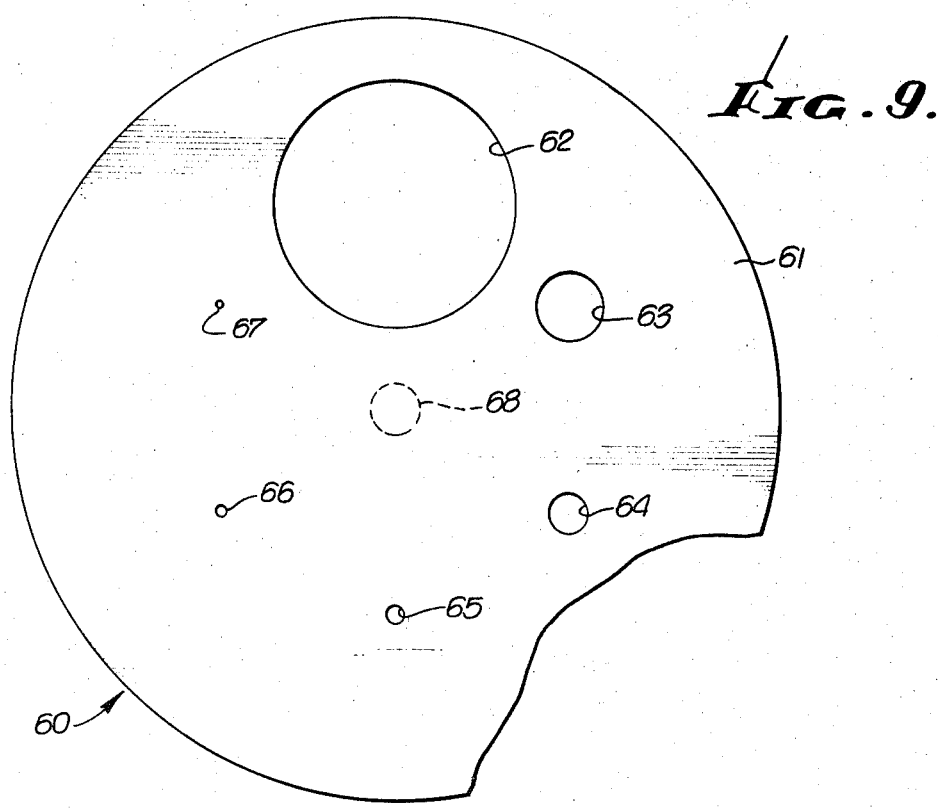
FIG. 9 is a fragmentary enlarged view taken in the plane indicated by line IX—IX of FIG. 8.

Means for T-stopping the measuring light path without insertion of a physical aperture means at the objective lens is shown at 60, FIGS. 8 and 9. FIG. 8 schematically indicates the operation of the T-stop means 60 which comprises a rotatable disc 61 located in a plane proximate to the plane of the light sensitive surface 44 of the photosensor 30. Disc 61 may have a single opening or hole 62 therein of selected area. As illustrated, disc 61 includes a hole such as 62 and a plurality of progressively smaller holes 63, 64, 65, 66 and 67 in which each hole has ten times less area than the preceding hole. Thus, in effect a multiple range switch for transmitting different amounts of light of the same intensity or light level to the sensitive surface 44 is provided by disc 61.

Disc 61 may be rotatably mounted about a shaft 68 having an axis parallel to the light measuring path at photosensor 30, said shaft 68 being connected to suitable means generally indicated at 69 for connection to a control exterior of housing 21 for turning the disc to a selected registered position with respect to surface 44 and the measuring light path.

In FIG. 8 light to be measured passing through aperture mirror 28 and forming an image at the measuring aperture is relayed by an integrator or relay lens 72 to the T-stop aperture or hole 62. Integrator lens 72 is focused at the position of maximum clear aperture of the objective lens 26' when the objective lens is focused on the nearest object objective lens 26' may be of varifocal or zoom type. This clear aperture image is projected by the integrator lens on the photo detector. FIG. 8 illustrates the projection of a T-stop 62 to the objective lens as indicated by light ray lines 73 which form a projected aperture stop 74 at objective lens 26. The largest opening for T-stop purposes which may be made in disc 61 depends upon the objective clear aperture, focal length, and near focus point of the objective lens.

It will be apparent to those skilled in the art that the above-described arrangement of T-stopping the measuring light path maintains for each aperture or hole 62–67 the light level reaching the image plane at the light sensitive surface 44 at a uniform or constant light level and that this constant light level is independent of the focal position of the objective lens 26. Furthermore, this method of T-stopping does not result in vignetting of the field of view (which may cause uneven weighting of different goniophotometric distributions), but also allows for rapid interchange of different objective lenses without need for a separate T-stop for each lens. Moreover, since a given hole diameter at 62 describes a fixed T-stop, independent of lens focal length, this system eliminates the variations in transmission or T-stop which is normally incurred when using zoom lenses. In addition, the T-stop means of this invention does not modify, change, or affect the measuring field which is defined by the aperture mirror 28. Moreover, when a plurality of openings or holes are employed in the T-stop wheel, neutral density filters are not required to attenuate light reaching the light sensitive surface 44 of the photosensor and, therefore, high light levels may be measured without incurring errors due to spectral selectivity of neutral density filters.

Viewing light path 23 provides a means for visually observing the area of the subject or source 24 from which the light being measured is received by the objective lens 26. Mirror surface 46 on the aperture mirror 28 reflects along the viewing path an image of the subject 24 which is larger than the area or part of the subject from which light is measured along the measuring light path. The area measured is represented by the aperture 27 or other aperture positioned at the focal plane of the objective lens 26 and such area appears to the observer as a black spot since no light is reflected from the aperture opening from the area of the subject being measured. Precise location of the spot is determined by the observer because of viewing the surrounding area of the subject 24.

In an optical system for a photometer including a viewing light path which does not include magnification change means 38 such a photometer being known as a "Pritchard photometer," the reflected light is transmitted along a viewing path to an eyepiece without magnification of the image transmitted thereby. In the present invention, the viewing light path includes a suitable light reflecting surface 33 which may be provided on the surface of a prism 80 arranged in a plane substantially parallel to the plane of aperture mirror 28. Light reflected from surface 33 is transmitted to a collimating lens 34 which provides parallel light beams to transmit the image to the erector or decollimating lens 35. In the collimated portion of a viewing light path which lies between the spaced lenses 34 and 35, the present invention provides magnification change means 38.

Magnification change means 38 comprises an afocal lens system comprising spaced afocal lens elements 82 and 83 mounted on upstanding members 84 and 85 of a frame 86 of generally wide U-section or tubular in form. Frame 86 is supported centrally between frame members 84 and 85 by a pivot shaft 87 which may be suitably mounted in the housing 21 in the collimated portion 88 of the viewing light path. External control means are provided (not shown) for rotating the frame 86 to selectively position the afocal lens means in one of several positions as described hereafter.

In FIG. 4 frame 86 and the afocal lens system is illustrated in inoperative position. Lens elements 84 and 83 are positioned with their optical axes at right angles to the viewing light path 23 and beyond the marginal rays of the collimated light portion 88. Thus, the image viewed along the viewing light path will be of normal magnification.

Figure 5:
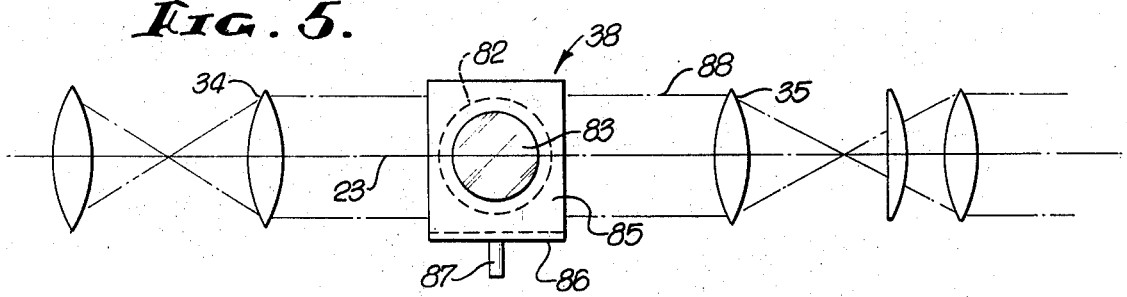
FIG. 5 is a view of the optical system shown in FIG. 4 and is taken from the plane indicated by line V—V of FIG. 4.
Figure 6:
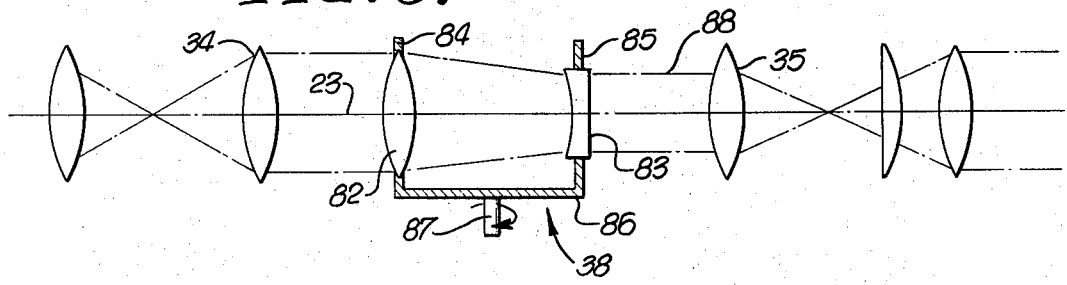
Fig. 6 is a view similar to FIG. 5 and shows the optical system of the viewing light path with the magnification means in one position.

In FIG. 6 frame 86 and afocal lens elements 82 and 83 are rotated 90° from the position shown in FIGS. 4 and 5 and are so located in the viewing light path 23 to position the lens elements 82 and 83 to provide maximum magnification. The afocal lens magnifier increases magnification of the optical system by a factor $M$ which is the magnification of the afocal magnifier.

Figure 7:
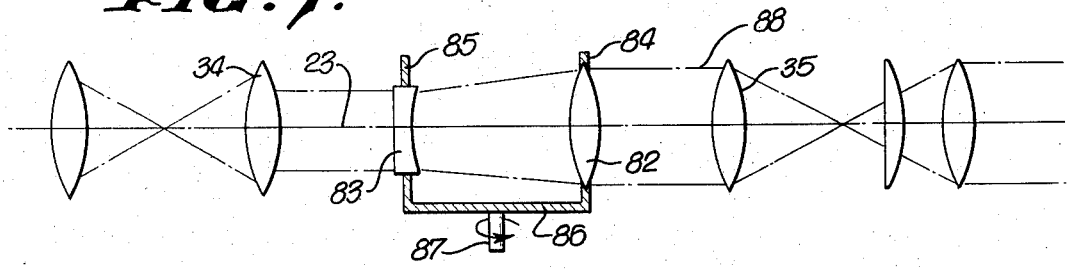
FIG. 7 is a view similar to FIG. 6 and shows the magnification means in another position.

In FIG. 7 the afocal magnifier system has been rotated 180° from the position shown in FIG. 6 so as to position the afocal magnifier lens elements 83 and 84 to reduce the normal magnification by a factor of $1/M$. Such position of the afocal magnifier elements will give minimum magnification.

It will be understood that the viewing magnification can be varied by a factor $M^2$ because the ratio of the two magnifications is $M$ divided by $1/M$. Since $M$ for a typical photometric optical system for this purpose may be from $2X$ to $4X$, this ratio may then be from about $4X$ to $16X$. It will thus be apparent that the rotatable afocal magnifier lens system placed in a collimated beam portion provides for three magnifications, namely $M$, $1/M$, and unity.

It may be noted that since the afocal magnifier system is located in a collimated light beam portion, the placement of the afocal magnifier is not critical. By utilizing the afocal magnifier elements in a collimated beam portion in the viewing light path, changing of the eyepiece optics or the objective lens to obtain magnification of the image is not required. In addition the magnifying optical system of the present invention is parfocalized and refocusing is not required when magnification is changed; when the magnification is changed, the eye relief remains constant and exit pupil diameter remains nearly constant.

A photometric optical system embodying the invention described above may be readily used by focusing the objective lens so that light from the selected area of the subject or light source impinges on the aperture mirror in the focal plane of the object lens which passes through the center of an aperture positioned at the optical axis of the measuring light path. Light which is transmitted through the aperture is directed to the light responsive surface of the photosensor by the relay lens and the rest of the light is reflected from the surface of the aperture mirror along the viewing light path. An observer views the image of the selected area as a black hole in the center of the field being viewed and this black hole accurately and unambiguously defines the area being measured. Turning the aperture mirror to a larger or smaller hole will increase or decrease the measuring field and the observer will view a larger or smaller black hole. The measuring field diameter may be varied from 0.001 percent to almost 100 percent of the viewing field. Note that this optical system is completely self-aligning insofar as the aperture location is concerned; even if the indexing system for the aperture disc did not place the aperture exactly on the optical centerline, the black hole in the viewfinder still correctly defines the measuring field. Furthermore, since the light passing through the measuring aperture in the aperture wheel is not reflected from any surface, the light being measured is free from polarization.

Another exemplary illustration of the invention is a photometer similar to that described above, but using a varifocal lens instead of the fixed-focal-length objective lens indicated at 26. The focal length of the varifocal lens can then be changed to continuously adjust the measuring field angle. The relay lens 29, 72, with its conjugate focal planes at the varifocal lens and at the photosensor, then serves to eliminate variations in lens transmission as the focal length of the varifocal objective lens is changed.

The magnification means described in the viewing light path is the subject of a copending patent application Ser. No. 214,587 filed by Ralph M. Weisner and owned by the same assignee of the present application.

Various modifications and changes may be made in the optical system described above which come within the spirit of this invention and all such changes coming within the scope of the appended claims are embraced thereby.

We claim:

1. In an optical system for a photometer in which light to be measured from a scene is directed along an optical path defined by an objective lens having a focal plane, a relay lens in said optical path having a focal plane at the objective lens, and a photosensor having a light responsive surface at the back focal plane of the relay lens, and in which light from the scene being viewed is directed along an optical path from the focal plane of the objective lens to a viewing eye piece, the combination of:

aperture mirror means located at the focal plane of the objective lens,
said aperture means having a mirror surface for directing light to the viewing light path,
said aperture means having a plurality of apertures of different area in said mirror surface selectively positionable in said focal plane at the optical axis of the objective lens,
each aperture when positioned in said focal plane at the optical axis limiting the field being examined by said photosensor in said measuring light path.

2. In a system as stated in claim 1 wherein said aperture means includes a wheel-like member mounted for rotation about its center, and wherein
said plurality of apertures are circularly arranged about said axis.

3. In an optical system as stated in claim 2 wherein said wheel-like member is disposed at an angle to the optical axis of the measuring light path.

4. In a system as stated in claim 1 wherein said apertures are of non-circular shape with respect to the plane of the aperture means.

5. In an optical system for a photometer which includes a measuring light path and includes a viewing light path of the area from which light is to be measured, the combination of:

an objective lens of varifocal type in said measuring light path to receive light from said area and having a back focal plane;
an aperture mirror means rotatable about an axis inclined to the measuring light path and having a plurality of apertures of different area, each aperture being positionable in the back focal plane of the varifocal lens,
a relay and integrator lens and a photosensor in said measuring light path, said relay lens having conjugate focal planes at said varifocal lens and at said photosensor;
and means at said photosensor including an aperture for compensating the transmission of T-stop variations of said varifocal objective lens.

6. In an optical system for a photometer including the combination of:

an objective lens having a back focal plane,
a relay lens in said path having a focal plane at the objective lens,
and a photosensor having a light responsive surface at the back focal plane of the relay lens,
said objective lens, relay lens, and photosensor defining a light path for measuring characteristics of light admitted to said objective lens;
means including an inclined apertured mirror in the measuring light path limiting the field being examined and directing light along a separate viewing light path and delineating the area from which light is to be measured;
and means including an aperture located at a focal plane of the relay lens at said photosensor whereby said relay lens and aperture located at the focal plane of the relay lens at said photosensor compensate for variations in light transmission as focal length of the objective lens is changed.

7. In an optical system as stated in claim 6, wherein said apertured mirror includes a plurality of apertures of different area selectively positionable in said focal plane.

8. In an optical system as stated in claim 6, wherein said objective lens is a varifocal lens;
 said relay lens having conjugate focal planes at said varifocal lens and at said aperture in proximity to said photosensor;
 whereby said relay lens and aperture forms a T-stop system for automatically compensating for variations in lens transmission as the focal length of the objective lens is varied.

9. In an optical system as stated in claim 1 including;
 said mirror surface including a reflectant coating,
 and a portion of said coating being removed to provide a selected nonreflecting light transmitting area positionable to pass light along said measuring light path.

10. In a luminance-radiance photometer having a viewing light path for observing the area from which light is being measured and a separate light path to measure characteristics of said light, the combination of:
 an objective lens;
 a mirror member positioned in the path of light transmitted by said objective lens and reflecting all wave lengths of said light at virtually unchanged intensity to said viewing light path;
 an opening in said mirror member at the focal plane of the objective lens to transmit light from an area to be measured along the light measuring path,
 said opening being viewable in said viewing light path as a black area;
 a relay lens in said light measuring path focused at a point which is the position of maximum clear aperture of the objective lens when the objective lens is focused on the nearest object;
 a photosensor having a photoresponsive surface upon which said clear aperture of said objective lens is projected by said relay lens;
 and a T-stop aperture means adjacent the photoresponsive surface of the photosensor to attenuate the intensity of light being measured as transmitted by said relay lens and without modification of the intensity of light reflected by said mirror member;

said T-stop aperture means maintaining the light intensity of measured light reaching the photoresponsive surface at a constant level independently of the focal position of the objective lens.

* * * * *